(12) United States Patent
Pao

(10) Patent No.: US 10,120,120 B2
(45) Date of Patent: Nov. 6, 2018

(54) REFLECTIVE DISPLAY APPARATUS AND FRONT LIGHT MODULE THEREOF

(71) Applicant: E Ink Holdings Inc., Hsinchu (TW)

(72) Inventor: Yu-Nan Pao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 49 days.

(21) Appl. No.: 15/073,671

(22) Filed: Mar. 18, 2016

(65) Prior Publication Data

US 2017/0102497 A1    Apr. 13, 2017

(30) Foreign Application Priority Data

Oct. 13, 2015    (TW) .............................. 104133554 A

(51) Int. Cl.
*F21V 7/04* (2006.01)
*F21V 8/00* (2006.01)

(52) U.S. Cl.
CPC .......... *G02B 6/0063* (2013.01); *G02B 6/005* (2013.01); *G02B 6/0036* (2013.01)

(58) Field of Classification Search
CPC ....................................................... F21V 7/04
USPC ........ 362/603, 600, 606, 608, 611, 615, 623
See application file for complete search history.

(56) References Cited

U.S. PATENT DOCUMENTS

| 7,507,012 | B2 | 3/2009 | Aylward et al. | |
|---|---|---|---|---|
| 7,777,954 | B2* | 8/2010 | Gruhike | G02B 26/001 359/291 |
| 8,508,694 | B2 | 8/2013 | Zhu | |
| 8,619,363 | B1* | 12/2013 | Coleman | G02B 5/18 359/576 |
| 2006/0152931 | A1* | 7/2006 | Holman | F21S 8/08 362/297 |
| 2006/0215263 | A1* | 9/2006 | Mi | G02B 5/3058 359/485.05 |
| 2008/0151578 | A1* | 6/2008 | Hiraishi | G02B 6/0061 362/620 |
| 2008/0285304 | A1 | 11/2008 | Rankin, Jr. | |

(Continued)

FOREIGN PATENT DOCUMENTS

| TW | M265634 U | 5/2005 |
|---|---|---|
| TW | I373636 B | 10/2012 |

(Continued)

OTHER PUBLICATIONS

Corresponding Taiwanese Office Action that these art references were cited dated Feb. 9, 2017.

*Primary Examiner* — Edwyn Labaze
(74) *Attorney, Agent, or Firm* — CKC & Partners Co., Ltd.

(57) ABSTRACT

A front light module includes a light guide plate, a light source and a light redirection film. The light guide plate includes a light incident surface, an inner light outgoing surface and an outer light outgoing surface. The light incident surface is adjoined between the inner light outgoing surface and the outer light outgoing surface. The light source is configured to emit light into the light incident surface of the light guide plate. The light redirection film is located beside the inner light outgoing surface, and is configured to redirect a traveling direction of the light from the light guide plate. An acute included angle between the light after redirected and a normal line of the inner light outgoing surface is less than an acute included angle between the light before redirected and the normal line of the inner light outgoing surface.

19 Claims, 8 Drawing Sheets

(56) References Cited

U.S. PATENT DOCUMENTS

| | | | | |
|---|---|---|---|---|
| 2009/0034268 A1* | 2/2009 | DiZio | ............... | G02F 1/133604 362/317 |
| 2009/0040771 A1* | 2/2009 | Greener | ............... | G02B 6/0038 362/330 |
| 2009/0190373 A1* | 7/2009 | Bita | ............... | B82Y 20/00 362/620 |
| 2009/0196071 A1* | 8/2009 | Matheson | ............ | G02B 6/0021 362/623 |
| 2011/0170184 A1* | 7/2011 | Wolk | ................ | G02B 27/2214 359/463 |
| 2011/0310332 A1* | 12/2011 | Boyd | .................. | G02B 6/0053 349/65 |
| 2012/0294037 A1* | 11/2012 | Holman | ................... | F21V 5/02 362/609 |
| 2013/0063968 A1* | 3/2013 | Neugebauer | ......... | G02B 6/0043 362/603 |
| 2014/0140091 A1* | 5/2014 | Vasylyev | ............... | G02B 6/001 362/606 |
| 2014/0286045 A1 | 9/2014 | Pao et al. | | |
| 2014/0320784 A1 | 10/2014 | Kweon et al. | | |
| 2014/0347600 A1 | 11/2014 | Yun et al. | | |
| 2015/0316705 A1* | 11/2015 | Chen | ................... | G02B 6/0063 362/613 |

FOREIGN PATENT DOCUMENTS

| | | |
|---|---|---|
| TW | I418864 B | 12/2013 |
| TW | I484229 B | 5/2015 |
| TW | I490568 B | 7/2015 |

\* cited by examiner

REFLECTIVE DISPLAY APPARATUS AND FRONT LIGHT MODULE THEREOF

RELATED APPLICATIONS

This application claims priority to Taiwan Application Serial Number 104133554, filed Oct. 13, 2015, which is herein incorporated by reference.

BACKGROUND

Technical Field

The present disclosure relates to a display apparatus. More particularly, the present disclosure relates to a reflective display apparatus and a front light module thereof.

Description of Related Art

A color display technique of a color e-book reader employs a color filter on a reflective display panel. The reflective display panel includes a plurality of microcapsules. The color filter includes a plurality of sub-pixel zones having different colors, such as red, green and blue. A color image of the color e-book reader can be rendered by controlling grayscale variation of the microcapsules underlying different sub-pixel zones.

Generally, ambient light is essential for the reflective display panel to render the image because the reflective display panel itself doe not emit light. If the reflective display panel is operated under a surrounding of weaker ambient light, the reflective display panel cannot clearly render the image. In order to address this issue, a front light module can be disposed in front of the display surface of the reflective display panel, so as to provide sufficient light to the reflective display panel when the ambient light is weak, and to benefit the image rendering.

However, when the front light module is employed in the color e-book reader, the unduly great incident angle of the incident light to the reflective display panel may cause inappropriate color rendering. Specifically, shown in FIG. 1 is an optical path schematic view of a typical color e-book reader 900. The color e-book reader 900 includes a reflective display panel 910, a color filter 920 and a front light module 930. The color filter 920 is located between the reflective display panel 910 and the front light module 930. The color filter 920 includes light filter zones 921, 922 and 923. The light filter zones 921, 922 and 923 have different permissible wavelength ranges. The front light module 930 includes a light source 931 and a light guide plate 932. In operation, light generated by the light source 931 can travel into the light guide plate 932 through a lateral surface of the light guide plate 932, and can travel out of the light guide plate 932 through a bottom surface of the light guide plate 932, and then, the light can travel through the color filter 920 and can be reflected by the reflective display panel 910.

In detail, the light S1 traveling out of the bottom surface of the light guide plate 932 can pass through the color filter 920 and arrive at the reflective display panel 910. The reflective display panel 910 can reflect the light S1 as the light S2. The light S2 can pass through the color filter 920 and travel out of the e-book reader 900 through an upper surface of the light guide plate 932. When the light outgoing angle φ is unduly great, the light S1 and S2 may respectively travel through different light filter zones 922 and 923, thereby causing incorrect or inappropriate color rendering. Moreover, FIG. 2 illustrates a relation between the light outgoing angle and the light intensity of the typical front light module. It is observed that, in the typical front light module, a light outgoing angle of most light is 83 degrees, and such a great light outgoing angle tends to cause the incorrect or inappropriate color rendering.

SUMMARY

One aspect of the present disclosure discloses a reflective display apparatus that allows light to travel into a reflective display panel along a more perpendicular direction. Therefore, the incident light to the reflective display panel from an incorrect sub-pixel zone of the color filter can be prevented when the reflective display apparatus renders a color image, so that the incorrect or inappropriate color rendering can be prevented.

In accordance with one embodiment of the present disclosure, a front light module includes a light guide plate, a light source and a light redirection film. The light guide plate includes a light incident surface, an inner light outgoing surface and an outer light outgoing surface. The light incident surface is adjoined between the inner light outgoing surface and the outer light outgoing surface. The light source is configured to emit light into the light incident surface of the light guide plate. The light redirection film is located beside the inner light outgoing surface, and is configured to redirect a traveling direction of the light from the light guide plate. An acute included angle between the light after redirected and a normal line of the inner light outgoing surface is less than an acute included angle between the light before redirected and the normal line of the inner light outgoing surface.

In accordance with one embodiment of the present disclosure, a reflective display apparatus includes a light guide plate, a light source and a light redirection film. The light guide plate includes a light incident surface and a light outgoing surface. The light incident surface is adjoined to the light outgoing surface. The light source is configured to emit light into the light incident surface of the light guide plate. The reflective display panel includes a display surface toward the light outgoing surface of the light guide plate. The light redirection film is located between the display surface of the reflective display panel and the light outgoing surface of the light guide plate. The light redirection film is configured to redirect a traveling direction of the light from the light guide plate toward the display surface. An acute included angle between the light after redirected and a normal line of the display surface is less than an acute included angle between the light before redirected and the normal line of the display surface.

In the foregoing embodiments, compared with the light before redirected, the light after redirected travels along a direction closer to the normal line of the inner light outgoing surface and/or the display surface. Therefore, the incident angle that the light after redirected travels into the display surface can be effectively reduced, thereby traveling out of the front light module and into the reflective display panel along a more perpendicular direction.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
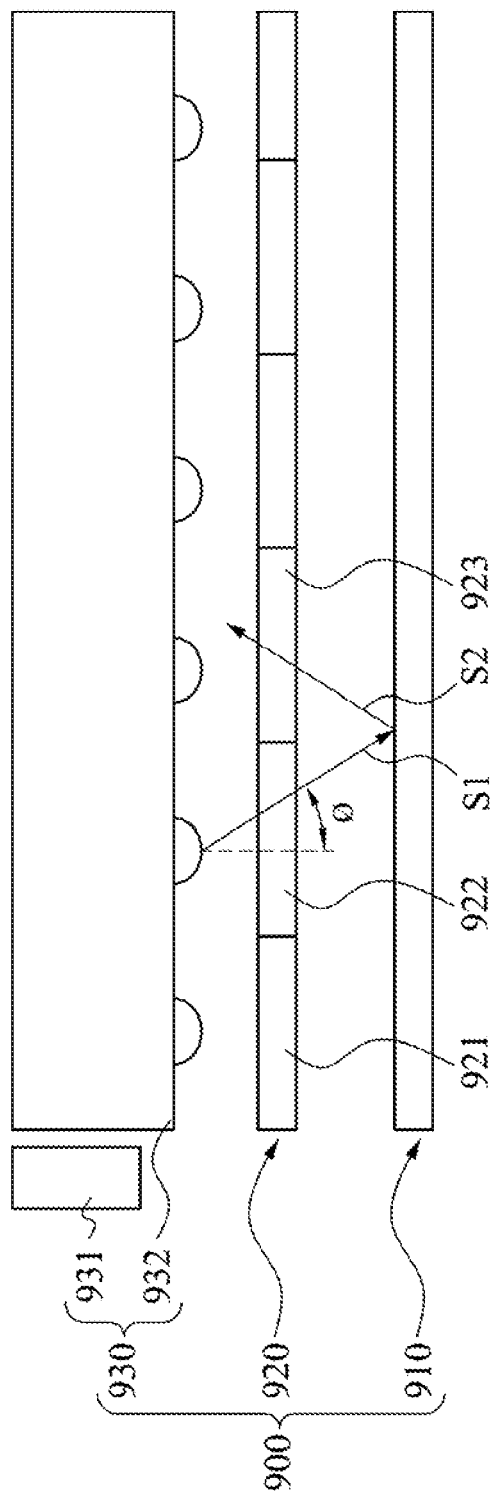
FIG. 1 is an optical path schematic view of a typical color e-book reader.
Figure 2:
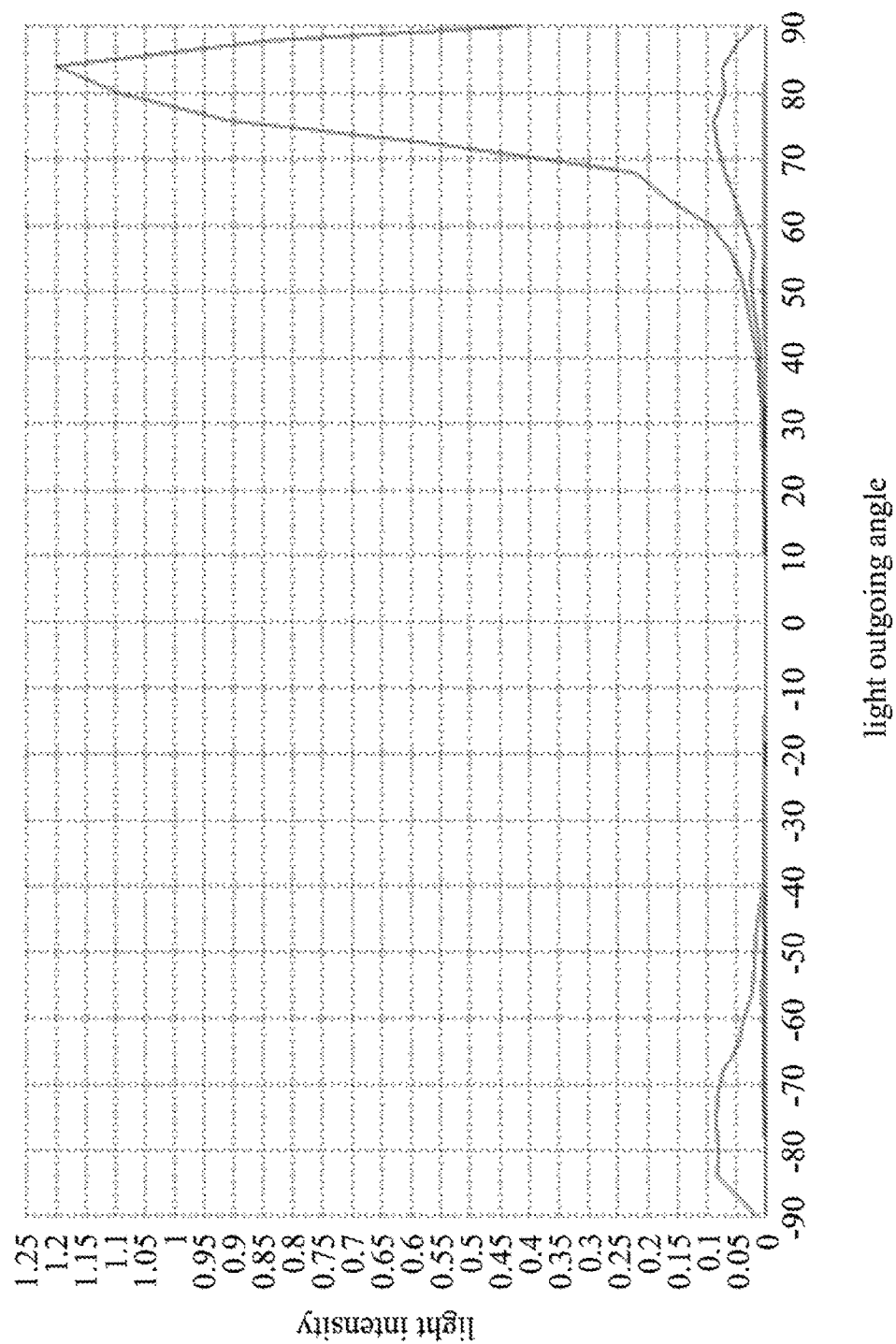
FIG. 2 illustrates a relation between the light outgoing angle and the light intensity of the typical front light module.

Reference will now be made in detail to the present embodiments of the disclosure, examples of which are illustrated in the accompanying drawings. Wherever possible, the same reference numbers are used in the drawings and the description to refer to the same or like parts.

Figure 3:
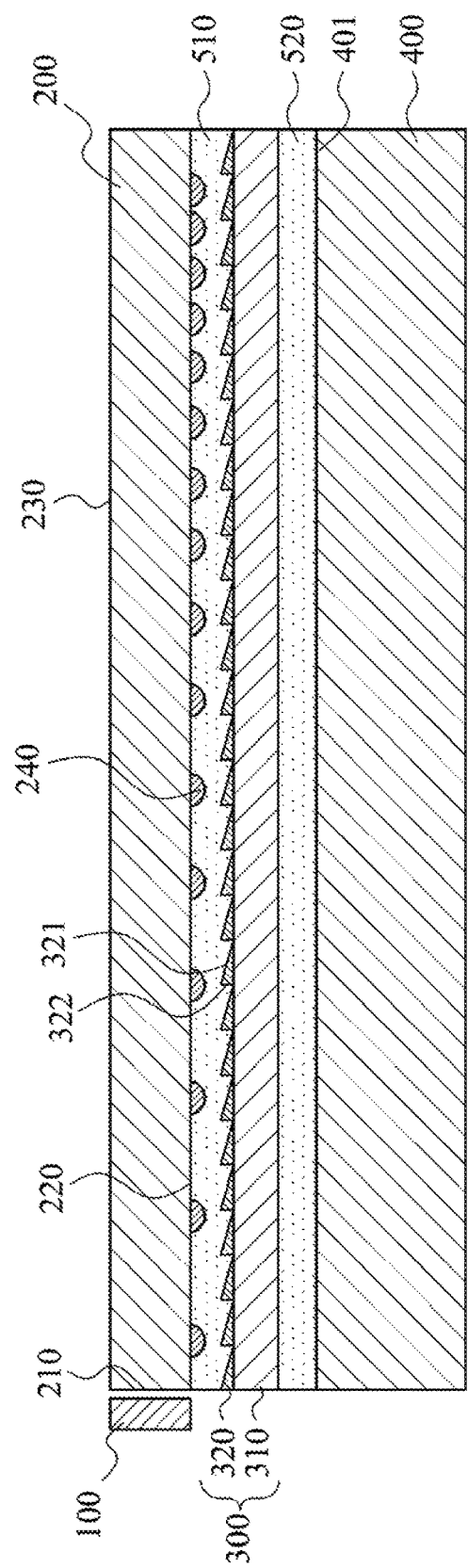
FIG. 3 is a cross-sectional view of a reflective display apparatus in accordance with one embodiment of the present disclosure.

FIG. 3 is a cross-sectional view of a reflective display apparatus in accordance with one embodiment of the present disclosure. As shown in FIG. 3, in this embodiment, the reflective display apparatus includes a light source 100, a light guide plate 200, a light redirection film 300 and a reflective display panel 400. The light source 100, the light guide plate 200, the light redirection film 300 cooperatively form a front light module. The light guide plate 200 includes a light incident surface 210, an inner light outgoing surface 220 and an outer light outgoing surface 230. The light incident surface 210 is adjoined between the inner light outgoing surface 220 and the outer light outgoing surface 230. The light source 100 is configured to emit light into the light incident surface 210 of the light guide plate 200. For example, the light source 100 can be located beside the light incident surface 210 and can emit light toward the light incident surface 210. The reflective display panel 400 includes a display surface 401. The display surface 401 faces toward the inner light outgoing surface 220 of the light guide plate 200. The light redirection film 300 is located beside the inner light outgoing surface 220. In detail, the light redirection film 300 is located between the display surface 401 of the reflective display panel 400 and the inner light outgoing surface 220 of the light guide plate 200. The light redirection film 300 is configured to redirect a traveling direction of the light from the light guide plate 200 and to make the light travel along a more perpendicular direction toward the display surface 401.

Figure 4:
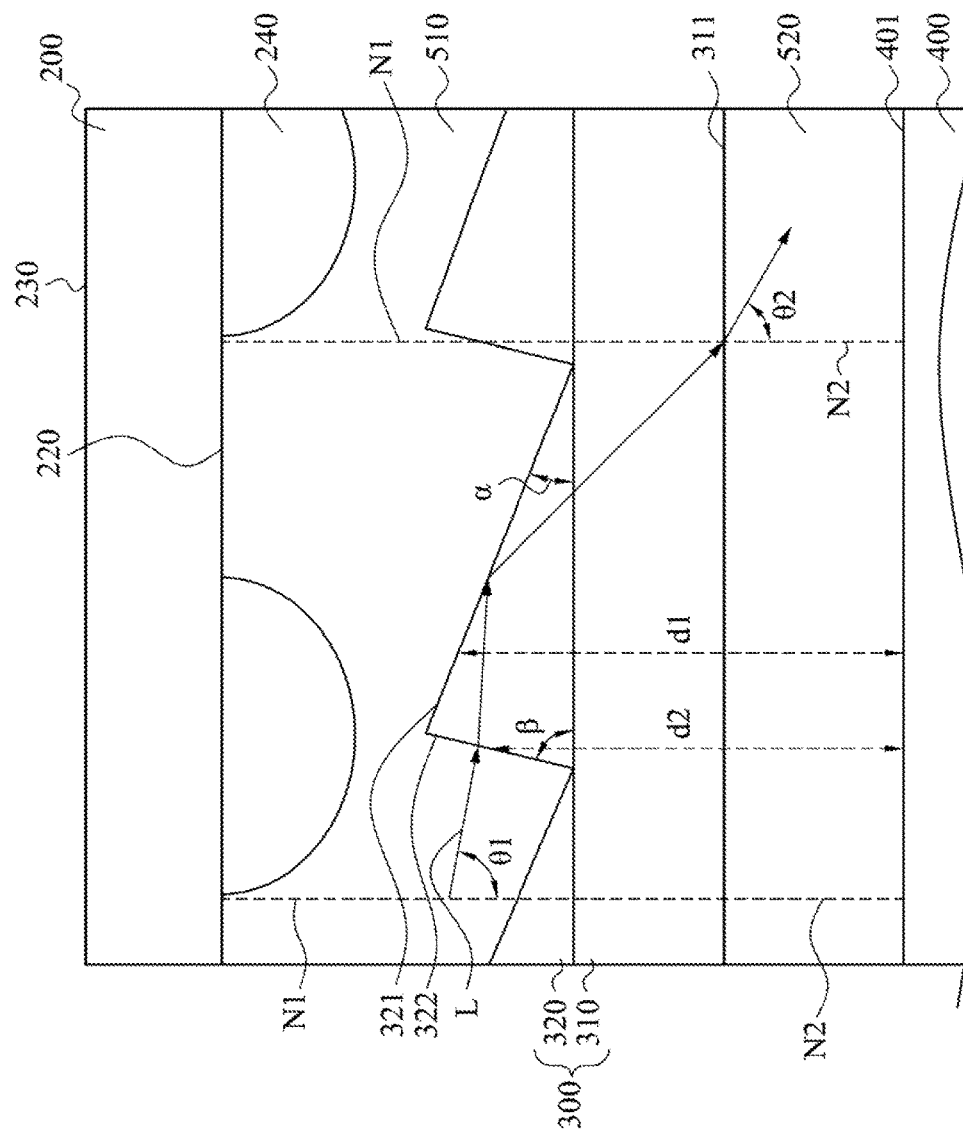
FIG. 4 is an optical path schematic view of the reflective display apparatus of FIG. 3.

In a greater detail, as shown in FIG. 4, which is an optical path schematic view of the reflective display apparatus of FIG. 3, the inner light outgoing surface 220 has a normal line N1. A light L from the light guide plate 200 can travel into the light redirection film 300, and the light redirection film 300 can redirect a traveling direction of the light L and make the light L travel out of the light redirection film 300. The light L before redirected and the normal line N1 of the inner light outgoing surface 220 define an acute included angle $\theta 1$ therebetween. The light L after redirected and the normal line N1 of the inner light outgoing surface 220 define an acute included angle $\theta 2$ therebetween. The acute included angle $\theta 2$ is less than the acute included angle $\theta 1$. In other words, compared to the light L before redirected, the light L after redirected is close to the normal line N1 of the inner light outgoing surface 220. Therefore, the light redirection film 300 can make the light L travel out of the front light module along a more perpendicular direction.

In some embodiments, the display surface 401 has a normal line N2. An acute included angle between the light L after redirected and the normal line N2 of the display surface 401 is less than an acute included angle between the light before redirected and the normal line N2 of the display surface 401. In other words, compared to the light L before redirected, the light after redirected is closer to the normal line N2 of the display surface 401. Therefore, the light redirection film 300 can make the light L travel into the reflective display panel 400 along a more perpendicular direction. In some embodiments, the display surface 401 is substantially parallel to the inner light outgoing surface 220. In other words, the normal lines N1 and N2 are parallel to each other. Therefore, the acute included angle between the light L before redirected and the normal line N2 of the display surface 401 is also $\theta 1$, and the acute included angle between the light L after redirected and the normal line N2 of the display surface 401 is also $\theta 2$. In some embodiments, the display surface 401 and the inner light outgoing surface 220 can be non-parallel as well.

In some embodiments, as shown in FIG. 4, the light redirection film 300 redirects the light L by reflection. Specifically, the light redirection film 300 includes a light transmissive film body 310 and a plurality of light redirection microstructures 320. The light redirection microstructures 320 are disposed on the light transmissive film body 310. The light redirection microstructures 320 are closer to the light guide plate 200 than the light transmissive film body 310 is. The light redirection microstructures 320 and the reflective display panel 400 are respectively located on opposite sides of the light transmissive film body 310. In other words, the light redirection microstructures 320 are adjacent to the light guide plate 200. At least one light redirection microstructure 320 includes a first surface 321. A perpendicular distance d1 from the first surface 321 to the display surface 401 decreases along a direction away from the light source 100 (See FIG. 3). In particular, the first surface 321 can be an oblique planar surface, which is oblique toward the display surface 401 along the direction away from the light source 100 (namely, oblique from the upper left side to the lower right side in the figure).

As a result, when the light L travels into the light redirection microstructures 320 to arrive at the first surface 321, the first surface 321 can reflect the light L toward the display surface 401. Compared to the light before reflected, the light L after reflected can be closer to the normal line N2 of the display surface 401, thereby benefiting the light L to travel into the reflective display panel 400 along a more perpendicular direction. In some embodiments, one or more light redirection microstructures 320 include the first surfaces 321 that satisfy the feature "the perpendicular distance d1 decreases along the direction away from the light source 100". In some embodiments, the first surfaces 321 of all light redirection microstructures 320 satisfy the feature "the perpendicular distance d1 decreases along the direction away from the light source 100", so as to make most light be redirected by the light redirection film 300, thereby traveling into the reflective display panel 400 along a more perpendicular direction.

In some embodiments, the light transmissive film body 310 includes a rear surface 311 facing away from the light redirection microstructures 320. A perpendicular distance from the first surface 321 to the rear surface 311 decreases along the direction away from the light source 100 as well, so as to benefit the light L to travel out of the light redirection film 300 through the light transmissive film body 310. In some embodiments, the rear surface 311 of the light transmissive film body 310 can be substantially parallel to the display surface 401 of the reflective display panel 400. In some embodiments, the rear surface 311 of the light transmissive film body 310 and the display surface 401 of the reflective display panel 400 can be non-parallel as well.

In some embodiments, as shown in FIG. 4, the reflective display apparatus further includes a light transmissive adhesive layer 510. The light transmissive adhesive layer 510 is adhered between the light redirection microstructures 320 and the light guide plate 200. Therefore, the light transmissive adhesive layer 510 can fix the light guide plate 200 and the light redirection film 300. In some embodiments, a refractive index of a material of the light transmissive adhesive layer 510 is less than a refractive index of a material of the light redirection microstructures 320, so as to benefit total reflection to occur when the light L arrives at the first surface 321. In a greater detail, when the incident angle that light L arrives at the first surface 321 is greater than the critical angle, total reflection occurs, which changes the direction of the light L and makes the light travel along a direction closer to the normal line N1 of the inner light outgoing surface 220 and/or the normal line N2 of the display surface 401.

In some embodiments, as shown in FIG. 4, the first surface 321 and the display surface 401 define an acute included angle α. The acute included angle α ranges from 30 degrees to 50 degrees. The acute included angle α in this range may preferably make the light L after reflected travel along the direction closer to the normal line N2 of the display surface 401. It is understood that the description "a parameter ranging from A to B" not only means that the parameter can be any value greater than A and less than B, but also means that the parameter can be equal to A or B. It is also understood that, in FIG. 4, the acute included angle α is depicted between the first surface 321 and a surface in the light redirection film 300 parallel to the display surface 401 for benefiting illustration.

In some embodiments, when the inner light outgoing surface 220 of the light guide plate 200 is substantially parallel to the display surface 401 the first surface 321 and the inner light outgoing surface 220 can define the acute included angle α as well. The acute included angle α ranges from 30 degrees to 50 degrees. The acute included angle α in this range may preferably make the light L after reflected travel along the direction closer to the normal line N1 of the inner light outgoing surface 220.

In some embodiments, a material of the light transmissive adhesive layer 510 can be, but is not limited to, optically clear adhesive (OCA) or optically clear resin (OCR). A material of the light redirection microstructures 320 can be, but is not limited to, PET, PC or PMMA. The foregoing material can benefit the refractive index of the material of the light transmissive adhesive layer 510 less than the refractive index of the material of the light redirection microstructures 320, so as to benefit occurring of total reflection when the light L arrives at the first surface 321.

In some embodiments, a material of the light redirection microstructures 320 and a material of the light transmissive film body 310 are the same or similar, so as to prevent unnecessary reflection and/or refraction from occurring when the light travels through the interface between the light transmissive film body 310 and the light redirection microstructures 320. In some embodiments, as shown in FIG. 4, the light redirection microstructure 320 further includes a second surface 322 adjoined to the first surface 321. The second surface 322 is closer to the light source 100 (See FIG. 3) than the first surface 321 is. A perpendicular distance d2 from the second surface 322 to the display surface 401 increases along the direction away from the light source 100. In other words, the second surface 322 is oblique away from the display surface 401 along the direction away from the light source 100 (namely, oblique from the lower left side to the upper right side in the figure). Such an oblique design benefits the light L to arrive at the first surface 321 without being redirected when traveling into the light redirection microstructures 320. In some embodiments, the perpendicular distance from the second surface 322 to the rear surface 311 increases along the direction away from the light source 100 as well, so as to benefit the second surface 322 to be oblique from the lower left side to the upper right side in the figure.

In some embodiments, the second surface 322 and the display surface 401 define an acute included angle β. The acute included angle β is greater than or equal to 70 degrees. The acute included angle β in this range may preferably reduce chances of redirection when the light L arrives at the second surface 322. In some embodiments, the second surface 322 is substantially perpendicular to the display surface 401, so that a cross-section of the light redirection microstructure 320 may be formed in a right triangular shape, in which a standing side thereof adjacent to a right angle thereof is closer to the light source 100 (See FIG. 3) than a hypotenuse thereof is. In other words, when the second surface 322 is substantially perpendicular to the display surface 401, a thickness of the light redirection microstructure 320 decreases along the direction away from the light source 100, which benefits occurring of total reflection when the light L arrives at the first surface 321.

In some embodiments, as shown in FIG. 4, when the inner light outgoing surface 220 of the light guide plate 200 is substantially parallel to the display surface 401, the second surface 322 and the inner light outgoing surface 220 can define the acute included angle β as well. The acute included angle β is greater than or equal to 70 degrees, so as to reduce chances of redirection when the light L arrives at the second surface 322. In some embodiments, the second surface 322 can be substantially perpendicular to the inner light outgoing surface 220 as well, so that a cross-section of the light redirection microstructure 320 can be formed in a right triangular shape, in which the standing side thereof is closer to the light source 100 (See FIG. 3) than the hypotenuse thereof is.

In some embodiments, as shown in FIG. 3, the light redirection microstructures 320 are adjoined continuously. In a greater detail, the first surface 321 of the light redirection microstructure 320 closer to the light source 100 is adjoined to the second surface 322 of the light redirection microstructure 320 farther away from the light source 100, and no interval is present therebetween. As a result, most light from the light guide plate 200 can travel into the light redirection microstructure 320 and be reflected by the first surface 321 to travel into the reflective display panel 400, thereby benefiting the reflective display panel 400 to receive more perpendicular light.

Figure 5:
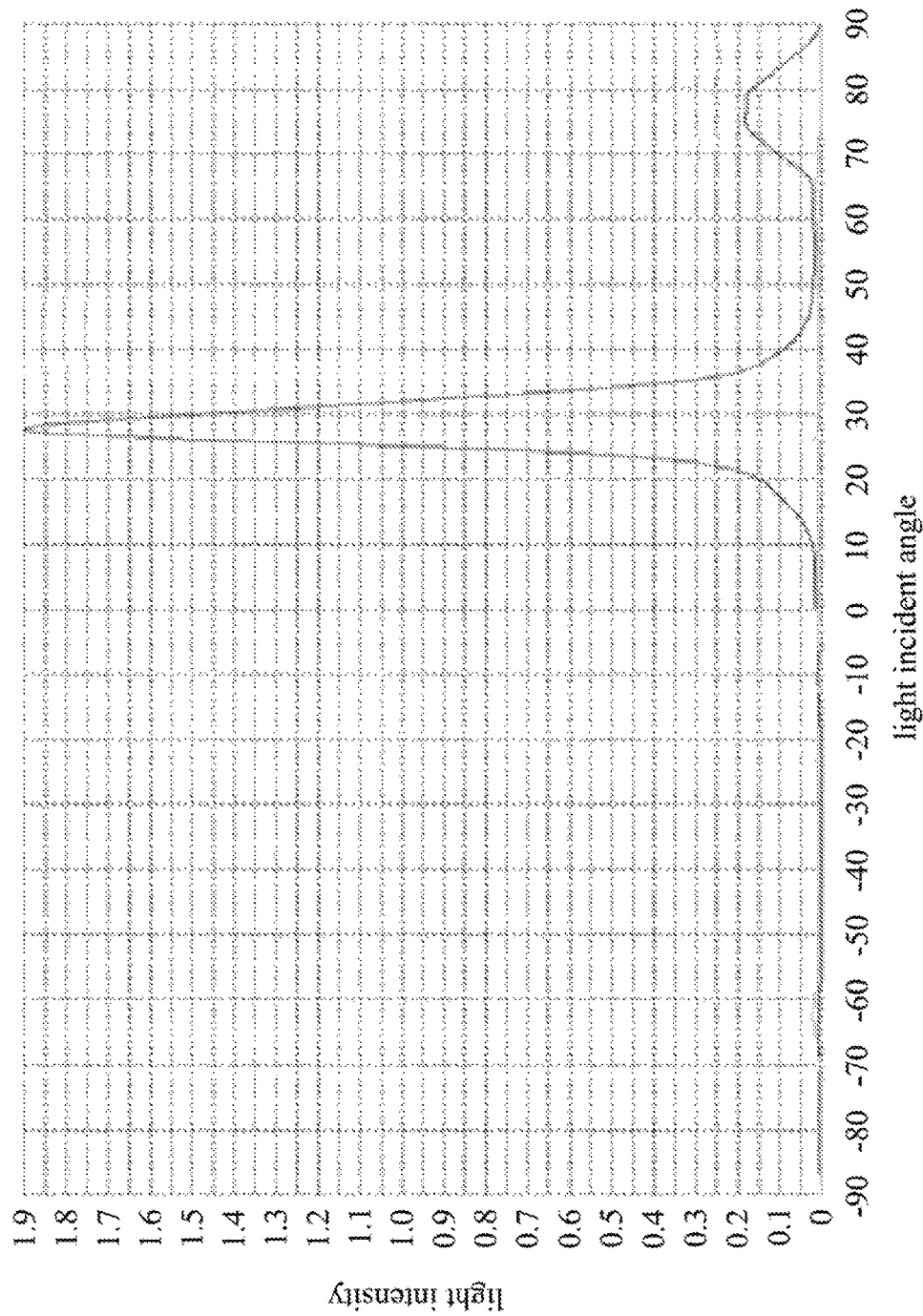
FIG. 5 illustrates a relation between the light incident angle and the light intensity of the light received by the display surface of the reflective display apparatus in FIG. 3.

FIG. 5 illustrates a relation between the light incident angle and the light intensity of the light received by the display surface 401 of the reflective display apparatus in FIG. 3. In FIG. 5, the horizontal axis refers to the light incident angle of the light received by the display surface 401, and the vertical axis refers to the light intensity of the light traveling into the display surface 401 at the corresponding incident angle. As shown in FIG. 5, the light incident angle of most light traveling into the display surface 401 is about 28 degrees. In other words, the acute included angle between the incident light of the display surface 401 and the normal line N2 is only about 28 degrees. Therefore, the light redirection film 300 can effectively benefit the light to travel into the display surface 401 along a more perpendicular direction.

In some embodiments, as shown in FIG. 3, the light transmissive adhesive layer 510 is not only adhered between the first surface 321 of the light redirection microstructure 320 and the inner light outgoing surface 220 of the light guide plate 200, but it can be also adhered between the second surface 322 of the light redirection microstructure 320 and the inner light outgoing surface 220 of the light guide plate 200. Therefore, the light transmissive adhesive layer 510 can fix the light redirection film 300 and the light guide plate 200 more stably and securely. In some embodiments, a material of the light transmissive adhesive layer 510 can be, but is not limited to, OCA or OCR.

In some embodiments, as shown in FIG. 3, the reflective display apparatus further includes a light transmissive adhesive layer 520. The light transmissive adhesive layer 520 is adhered between the light redirection film 300 and the display surface 401 of the reflective display panel 400, so as to fix the light redirection film 300 and the reflective display panel 400. In some embodiments, a material of the light transmissive adhesive layer 520 can be, but is not limited to, OCA or OCR.

In some embodiments, as shown in FIG. 3, the outer light outgoing surface 230 and the inner light outgoing surface 220 are respectively located on opposite sides of the light guide plate 200, and the outer light outgoing surface 230 is exposed or revealed. In a greater detail, the outer light outgoing surface 230 is light transmissive and is not shaded by reflective materials or opaque materials. As such, when light is reflected by the reflective display panel 400, the reflected light can travel through the light transmissive adhesive layer 520, the light redirection film 300 and the light transmissive adhesive layer 510 in order, and then, the light can travel into the light guide plate 200 through the inner light outgoing surface 220 and can travel out of the reflective display apparatus through the outer light outgoing surface 230, so as to allow the user to see the reflective image rendered by the reflective display panel 400.

In some embodiments, the reflective panel can be, but is not limited to, an electro phonetic display (EPD), a liquid crystal display (LCD) or an electro wetting display (EWD). For example, if the reflective display panel 400 is the EPD, the reflective display panel 400 can include a plurality of microcapsules. Each microcapsule has a plurality of deep-colored charged particles and light-colored charged particles therein. The charges of the deep-colored charged particles and the light-colored charged particles are different. For example, the light-colored charged particles may be positively charged, while the deep-colored charged particles may be negatively charged. As a result, positions of the light-colored charged particles and the deep-colored charged particles in each microcapsule can be controlled by an electric field, so as to render a grayscale image. In other words, the reflective display panel 400 can be a grayscale display panel.

In some embodiments, as shown in FIG. 3, the light guide plate 200 further includes a plurality of light outgoing microstructures 240. The light outgoing microstructures 240 are disposed on the inner light outgoing surface 220 to prevent total reflection, thereby benefiting the light to travel out of the inner light outgoing surface 220 and therefore travel to the reflective display panel 400 through the light redirection film 300. In other words, the light outgoing microstructures 240 can improve the light intensity received by the reflective display panel 400. In some embodiments, the light redirection microstructures 320 are adjacent to the light outgoing microstructures 240 of the light guide plate 200.

In some embodiments, as shown in FIG. 3, the farther the light outgoing microstructures 240 are located from the light source 100, the closer the light outgoing microstructures 240 are arranged. Therefore, when the light travels to a rear zone of the light guide plate 200, it can travel out of the inner light outgoing surface 220 in an easier manner. Therefore, even if a majority of light travels out of the inner light outgoing surface 220 in a front zone of the light guide plate 200, which lowers the light flux in the rear zone of the light guide plate 200, the difference between light intensities received on front and rear zones of the reflective display panel 400 may be reduced because the light in the rear zone of the light guide plate 200 tends to travel out of the inner light outgoing surface 220 in an easier manner. As such, different zones of the reflective display panel 400 may receive uniform light intensity.

In some embodiments, as shown in FIG. 3, the density arrangement of the light outgoing microstructures 240 can improve the uniformity of the outgoing light, so the light redirection microstructures 320 are not required to be arranged in consideration of the uniformity of the light. Therefore, in some embodiments, the light redirection microstructures 320 can be arranged uniformly. In other words, intervals between any two adjacent light redirection microstructures 320 are equal. Preferably, intervals between any two adjacent light redirection microstructures 320 are zero. That is, the light redirection microstructures 320 are adjoined continuously. Since the light redirection microstructures 320 are arranged uniformly, fine alignment of the light redirection film 300 and the light guide plate 200 can be ignored or omitted when assembling the light redirection film 300 and the light guide plate 200, so as to benefit to assemble the reflective display apparatus.

In some embodiments, the light outgoing microstructures 240 are protruded from the inner light outgoing surface 220. For example, the light outgoing microstructures 240 are semi-spheres protruded from the inner light outgoing surface 220. In some embodiments, the light outgoing microstructures 240 are concave in the inner light outgoing surface 220. For example, the light outgoing microstructures 240 are semi-spherical recesses formed in the inner light outgoing surface 220. It is understood that the foregoing shapes of the light outgoing microstructures 240 are only exemplary, not limiting the present disclosure.

Figure 6:
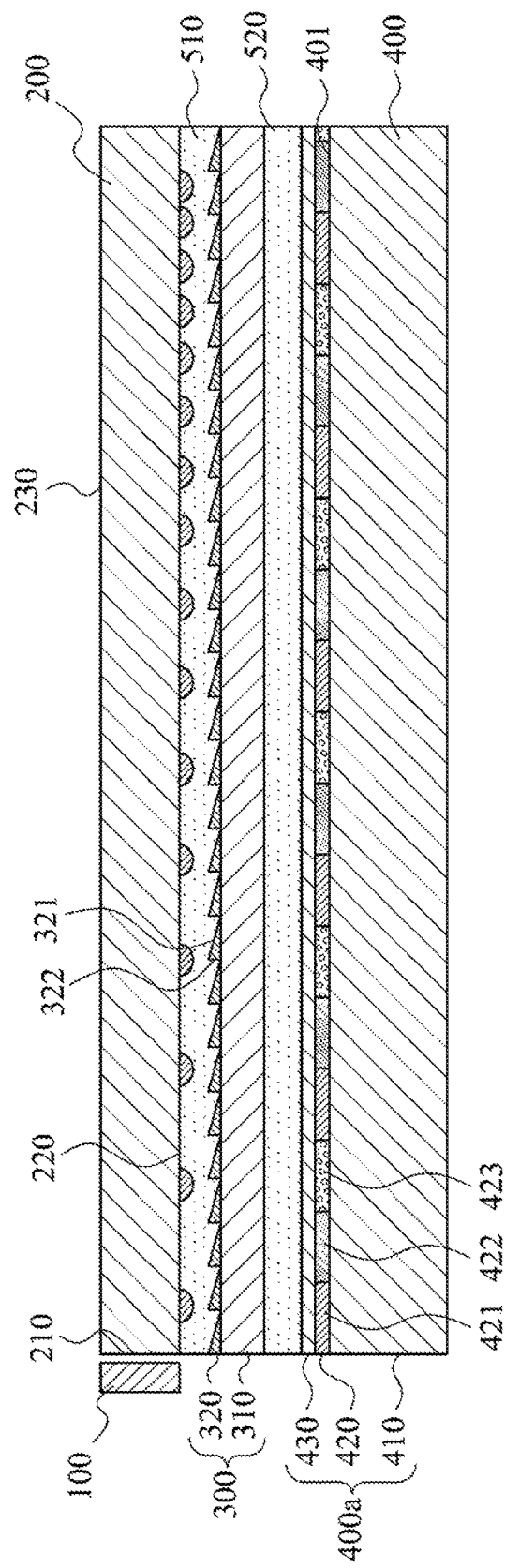
FIG. 6 is a cross-sectional view of a reflective display apparatus in accordance with another embodiment of the present disclosure.

FIG. 6 is a cross-sectional view of a reflective display apparatus in accordance with another embodiment of the present disclosure. As shown in FIG. 6, the main difference between this embodiment and which is shown in FIG. 3 is that: the reflective display panel 400a is a color display panel, rather than the grayscale display panel. In particular, the reflective display panel 400a includes a color filter therein. Specifically, the reflective display panel 400a includes a reflective display module 410, a light filter film 420 and a light filter film substrate 430. The light filter film 420 and the light filter film substrate 430 cooperatively form the color filter. The light filter film 420 includes a plurality of light filter zones 421, 422 and 423. The wavelength ranges that the light filter zones 421, 422 and 423 allow to pass are different. For example, the wavelength range that the light filter zone 421 allows to pass is red light, the wavelength range that the light filter zone 422 allows to pass is green light, and the wavelength range that the light filter zone 423 allows to pass is blue light. Therefore, the light filter zones 421, 422 and 423 can respectively filter out light with different wavelengths, thereby benefiting to render a color image.

In some embodiments, as shown in FIG. 6, the light filter zones 421, 422 and 423 are arranged along a direction substantially parallel to the display surface 401. More particularly, the light filter zones 421, 422 and 423 are arranged along the direction away from the light source 100. Although such an arrangement direction may cause the incident light and reflected light of the reflective display panel 400a to travel through different light filter zones (such as, the incident light traveling through the light filter zone 421, while the reflected light traveling through the light filter zone 422), incorrect or inappropriate color rendering can be reduced because the light redirection film 300 allows the light to travel into the reflective display panel 400a along a more perpendicular direction, which effectively reduces the light incident and reflection angles to benefit the incident and reflected light to travel through the same light filter zone (such as the light filter zone 421). As a result, the light redirection film 300 can effectively reduce incorrect or inappropriate color rendering, so as to benefit the reflective display panel 400a to render the required color.

In some embodiments, the light filter film 420 is located between the reflective display module 410 and the light filter film substrate 430. The display surface 401 is an upper surface of the reflective display module 410 and is adhered to the light filter film 420. For example, an optical adhesive can be present between the reflective display module 410 and the light filter film 420, and therefore adheres the reflective display module 410 and the light filter film 420. In some embodiments, the reflective display module 410 is, but is not limited to, an electrophoretic display module. The light from the front light module can travel through the light filter film substrate 430 and the light filter film 420 from the light transmissive adhesive layer 520 in order, and the light can arrive at the microcapsules in the reflective display module 410. When the light is reflected by the light-colored charged particles in the microcapsules, the reflected light can travel through the light filter film 420 and the light filter film substrate 430 and out of the reflective display panel 400a in order.

Figure 7:
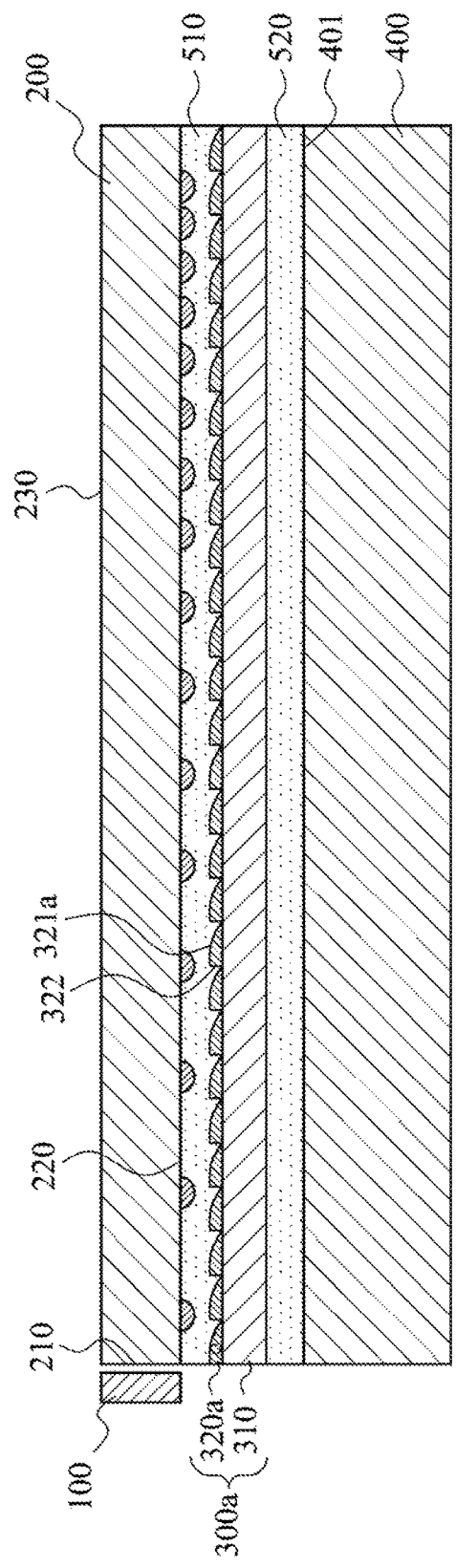
FIG. 7 is a cross-sectional view of a reflective display apparatus in accordance with another embodiment of the present disclosure.

FIG. 7 is a cross-sectional view of a reflective display apparatus in accordance with another embodiment of the present disclosure. As shown in FIG. 7, the main difference between this embodiment and which is shown in FIG. 3 is that: the shape of the light redirection microstructure 320a of the light redirection film 300a is different from the shape of the foregoing light redirection microstructure 320. In particular, the first surface 321a of the light redirection microstructure 320a is a convex surface. The perpendicular distance from the convex surface to the display surface 401 decreases along the direction away from the light source 100, so as to benefit the light to be reflected to the reflective display panel 400 by the convex surface in a total reflection manner.

Figure 8:
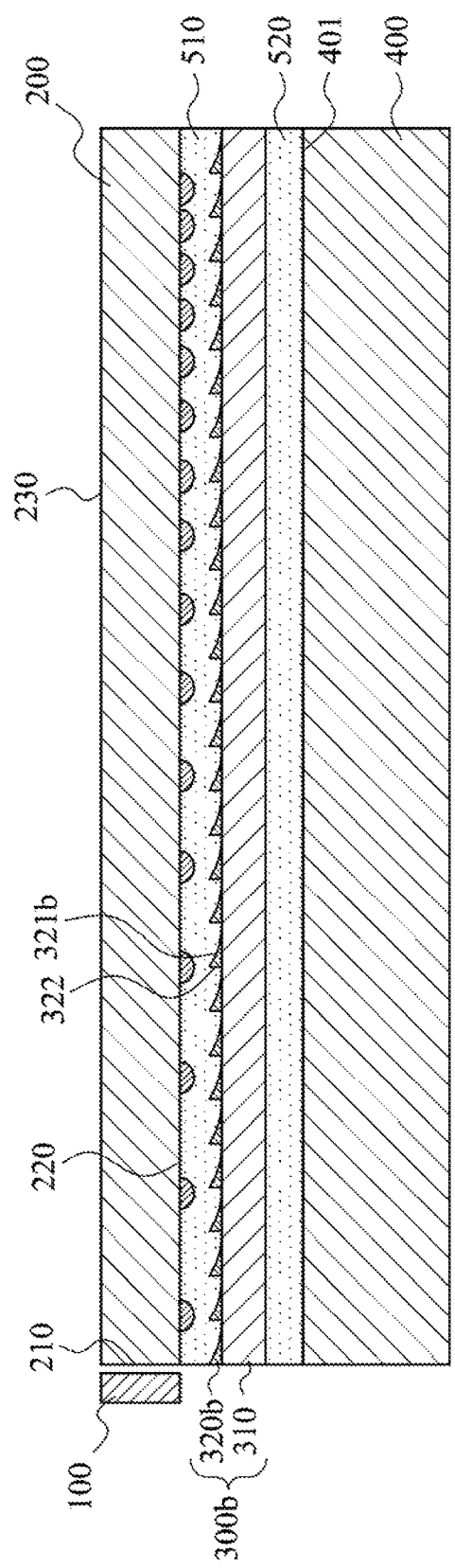
FIG. 8 is a cross-sectional view of a reflective display apparatus in accordance with another embodiment of the present disclosure.

FIG. 8 is a cross-sectional view of a reflective display apparatus in accordance with another embodiment of the present disclosure. As shown in FIG. 8, the main difference between this embodiment and which is shown in FIG. 3 is that the shape of the light redirection microstructure 320b of the light redirection film 300b is different from the shape of the foregoing light redirection microstructure 320. In particular, the first surface 321b of the light redirection microstructure 320b is a concave surface. The perpendicular distance from the concave surface to the display surface 401 decreases along the direction away from the light source 100, so as to benefit the light to be reflected to the reflective display panel 400 by the convex surface in a total reflection manner.

Although the foregoing embodiments disclose the first surface 321, 321a and 321b in different shapes, these shapes are only exemplary, not limiting the present disclosure. As long as the light can be reflected to the reflective display panel in a manner of total reflection, the first surface can be formed in other shapes as well, such as a jagged shape, a wavy shape or combinations thereof, but the present disclosure is not limited to these shapes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A front light module, comprising:
   a light guide plate comprising a light incident surface, an inner light outgoing surface and an outer light outgoing surface, the light incident surface being adjoined between the inner light outgoing surface and the outer light outgoing surface;
   a light source configured to emit light into the light incident surface of the light guide plate; and
   a light redirection film located beside the inner light outgoing surface, and configured to redirect a traveling direction of the light from the light guide plate, wherein an acute included angle between the light after redirected and a normal line of the inner light outgoing surface is less than an acute included angle between the light before redirected and the normal line of the inner light outgoing surface, the light redirection film comprising a light transmissive film body and a plurality of light redirection microstructures protruding from the light transmissive film body, wherein the light redirection microstructures are between the light transmissive film body and the light guide plate, wherein at least one of the light redirection microstructures comprises a first surface, and wherein the first surface and the inner light outgoing surface define an acute included angle therebetween, the acute included angle ranges from 30 degrees to 50 degrees.

2. The front light module of claim 1, wherein the light redirection microstructures are adjacent to the light guide plate; the light transmissive film body comprises a rear surface facing away from the light redirection microstructures; at least one of the light redirection microstructures comprises a first surface; and a perpendicular distance from the first surface to the rear surface decreases along a direction away from the light source.

3. The front light module of claim 2, wherein the light redirection microstructure comprises the first surface further comprises a second surface, wherein the second surface is adjacent to the first surface, and the second surface is closer to the light source than the first surface is; and a perpendicular distance from the second surface to the rear surface increases along a direction away from the light source.

4. The front light module of claim 3, wherein the second surface and the inner light outgoing surface define an acute included angle therebetween, and the acute included angle is greater than or equal to 70 degrees.

5. The front light module of claim 2, wherein the light redirection microstructure comprises the first surface further comprises a second surface that is adjacent to the first surface, wherein the second surface is closer to the light source than the first surface is; and the second surface is substantially perpendicular to the inner light outgoing surface.

6. The front light module of claim 2, further comprising a light transmissive adhesive layer at least adhered between the first surfaces of the light redirection microstructures and the inner light outgoing surface of the light guide plate.

7. The front light module of claim 6, wherein a refractive index of a material of the light transmissive adhesive layer is less than a refractive index of a material of the light redirection microstructures.

8. The front light module of claim 1, wherein the light guide plate comprises a plurality of light outgoing microstructures disposed on the inner light outgoing surface.

9. The front light module of claim 8, wherein the farther the light outgoing microstructures are located from the light source, the closer the light outgoing microstructures are arranged.

10. The front light module of claim 9, wherein the light redirection microstructures are adjacent to the light outgoing microstructures of the light guide plate; and the light redirection microstructures are uniformly arranged.

11. A reflective display apparatus, comprising:
a light guide plate comprising a light incident surface and an inner light outgoing surface, the light incident surface being adjoined to the inner light outgoing surface;
a light source configured to emit light into the light incident surface of the light guide plate;
a reflective display panel comprising a display surface toward the inner light outgoing surface of the light guide plate; and
a light redirection film located between the display surface of the reflective display panel and the inner light outgoing surface of the light guide plate, and the light redirection film configured to redirect a traveling direction of the light from the light guide plate toward the display surface, wherein an acute included angle between the light after redirected and a normal line of the display surface is less than an acute included angle between the light before redirected and the normal line of the display surface, wherein the light redirection film comprises a light transmissive film body and a plurality of light redirection microstructures disposed on the light transmissive film body, wherein at least one of the light redirection microstructures comprises a first surface, and a perpendicular distance from the first surface to the display surface decreases along a direction away from the light source.

12. The reflective display apparatus of claim 11, wherein the light redirection microstructures and the reflective display panel are respectively located on opposite sides of the light transmissive film body.

13. The reflective display apparatus of claim 12, wherein the first surface and the display surface define an acute included angle therebetween, and the acute included angle ranges from 30 degrees to 50 degrees.

14. The reflective display apparatus of claim 12, wherein the light redirection microstructure comprising the first surface further comprises a second surface that is adjacent to the first surface and is closer to the light source than the first surface is, wherein a perpendicular distance from the second surface to the display surface increases along a direction away from the light source.

15. The reflective display apparatus of claim 14, wherein the second surface and the display surface define an acute included angle therebetween, and the acute included angle is greater than or equal to 70 degrees.

16. The reflective display apparatus of claim 12, wherein the light redirection microstructure comprising the first surface further comprises a second surface that is adjacent to the first surface, wherein the second surface is closer to the light source than the first surface is, and is substantially perpendicular to the display surface.

17. The reflective display apparatus of claim 12, wherein the first surface of the light redirection microstructure is formed in a planar shape, a convex shape, a concave shape, a jagged shape, a wavy shape or combinations thereof.

18. The reflective display apparatus of claim 11, wherein the reflective display panel comprises a color filter therein, and the color filter comprises a plurality of light filter zones, wherein the respective light filter zones have different permissible wavelength ranges.

19. The reflective display apparatus of claim 11, further comprising a light transmissive adhesive layer adhered between the light redirection film and the display surface of the reflective display panel.

* * * * *